(12) United States Patent
Johler et al.

(10) Patent No.: US 10,199,632 B2
(45) Date of Patent: Feb. 5, 2019

(54) INTERCONNECT FOR BATTERY PACK PROTECTION

(71) Applicants: Littelfuse, Inc., Chicago, IL (US); Littelfuse Electronics (Shanghai) Co., Ltd., Shanghai (CN)

(72) Inventors: Werner Johler, Shanghai (CN); Jianhua Chen, Sunnyvale, CA (US)

(73) Assignees: LITTELFUSE, INC., Chicago, IL (US); LITTELFUSE ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/055,426

(22) Filed: Feb. 26, 2016

(65) Prior Publication Data

US 2016/0254522 A1 Sep. 1, 2016

Related U.S. Application Data

(60) Provisional application No. 62/126,441, filed on Feb. 27, 2015.

(51) Int. Cl.
*H01M 10/0525* (2010.01)
*H01M 2/20* (2006.01)
(Continued)

(52) U.S. Cl.
CPC ......... *H01M 2/348* (2013.01); *H01M 2/1061* (2013.01); *H01M 2/204* (2013.01);
(Continued)

(58) Field of Classification Search
CPC ......... H01M 10/0525; H01M 2200/10; H01M 2200/101; H01M 2200/106;
(Continued)

(56) References Cited

U.S. PATENT DOCUMENTS 5,707,756 A * 1/1998 Inoue .................. H01M 2/1235
429/57
2003/0146734 A1 * 8/2003 Kozu .................... H01M 2/021
320/107
(Continued)

FOREIGN PATENT DOCUMENTS

| EP | 1271672 A1 | 1/2003 |
| EP | 1460698 A1 | 9/2004 |
| EP | 2515358 A1 | 10/2012 |

*Primary Examiner* — Sarah A. Slifka
*Assistant Examiner* — Lilia Nedialkova (57) ABSTRACT

A method of protecting a battery pack in which first and second battery cells, each having a positive electrode, a negative electrode, and an edge are aligned so that the positive electrodes of the first and second battery cells are adjacent. An electrically conductive busbar configured to be positioned on an edge of the first and second battery cells electrically connects the positive electrode of the first battery cell to a first protection device, the positive electrode of the second battery cell to a second protection device, the first protection device to the second protection device, and the negative electrode of the first battery cell to the negative electrode of the second battery cell. Also provided is a battery pack protection assembly.

20 Claims, 6 Drawing Sheets

(51) Int. Cl.
*H01M 2/34* (2006.01)
*H01M 2/10* (2006.01)

(52) U.S. Cl.
CPC .... *H01M 10/0525* (2013.01); *H01M 2200/10* (2013.01); *H01M 2200/101* (2013.01); *H01M 2200/106* (2013.01); *H01M 2220/30* (2013.01)

(58) Field of Classification Search
CPC ........... H01M 2200/30; H01M 2/1061; H01M 2/204; H01M 2/348
See application file for complete search history.

(56) References Cited

U.S. PATENT DOCUMENTS

| 2004/0119442 | A1* | 6/2004 | Lee | H02J 7/0042 320/112 |
|---|---|---|---|---|
| 2005/0271934 | A1 | 12/2005 | Kiger et al. | |
| 2016/0218533 | A1* | 7/2016 | Lim | H01M 2/10 |

* cited by examiner

INTERCONNECT FOR BATTERY PACK PROTECTION

CROSS-REFERENCE TO RELATED APPLICATIONS

This application claims priority from U.S. Provisional Application No. 62/126,441, filed Feb. 27, 2015, the disclosure of which is incorporated herein by reference.

BACKGROUND OF THE INVENTION

Field of the Invention

This invention relates to an interconnection for battery pack protection.

Introduction to the Invention

Electronic equipment such as notebook or laptop computers or tablets often contains multiple battery cells, or battery packs containing multiple cells, connected to one another as a means to provide adequate energy for laptop computers, tablets, and other electronic devices. Lithium-ion and lithium-polymer batteries (collectively "Li-batteries") are often used due to their high energy density, small form factors and design flexibility. However, Li-battery packs are sensitive to faults caused by external shorts, runaway charging conditions and/or abusive overcharging that can result in potentially damaging overcurrent and overtemperature conditions. The overcharge, deep-discharge, or short circuit conditions that create heat can cause a Li-battery cell to bloat, rupture, or experience other issues. Thus, it is necessary that the cells, whether individually or connected as a pack, be protected, e.g. by means of a thermal cutoff (TCO) device or other type of overcurrent and overtemperature device, that interrupts current in order to help prevent damage in the event of an overcurrent and/or overtemperature situation.

Protection devices such as positive temperature coefficient (PTC) devices and TCOs can be connected to the battery cell or pack in any manner, e.g. in series, in parallel, or any combination thereof, that allows appropriate protection. However, the arrangement of the batteries in the electrical equipment is subject to constraints such as space, which is a particular issue as electronic equipment becomes smaller and thinner. In addition, ease of connection and assembly is required. A conventional method of arranging batteries is to align the positive electrode in the first of a pair of battery cells with the negative electrode in the second of the pair, and to make a connection to the protection device(s) and from one positive electrode to a second positive electrode, and from one negative electrode to a second negative electrode, by means of wires. Such wires must be soldered or welded to the various components in the circuit, and the installation can result in a disordered and/or cluttered wiring arrangement. The complicated arrangement may have a conductive path with a long length which will have higher power dissipation, higher resistance, and higher voltage drop. All of these could result in the electronic equipment overheating. Furthermore, the arrangement takes up valuable space in the equipment, sometimes resulting in a larger device size to accommodate the protection devices and the wiring. Simplifying the arrangement while still providing adequate protection is thus desired.

BRIEF SUMMARY OF THE INVENTION

In a first aspect is provided a method of protecting a battery pack comprising (a) providing first and second battery cells, each having (i) a positive electrode, (ii) a negative electrode, and (iii) an edge;
(b) providing a first protection device and a second protection device;
(c) aligning the positive electrodes of the first and second battery cells;
(d) providing an electrically conductive busbar configured to be positioned on an edge of the first and second battery cells;
(e) electrically connecting the positive electrode of the first battery cell to the first protection device, the positive electrode of the second battery cell to the second protection device, and the first protection device to the second protection device by means of the busbar.

Also provided is a battery pack protection assembly comprising (a) first and second battery cells, each having (i) a positive electrode, (ii) a negative electrode, and (iii) an edge, the positive electrodes of the first and second battery cells being aligned with one another to form a pair;
(b) a first protection device and a second protection device; and
(c) an electrically conductive busbar positioned on the edge of the first and second battery cells and electrically connecting the positive electrode of the first battery cell to the first protection device, the positive electrode of the second battery cell to the second protection device, the first protection device to the second protection device, and the negative electrode of the first battery cell to the negative electrode of the second battery cell.

DETAILED DESCRIPTION OF THE INVENTION

Figure 1:
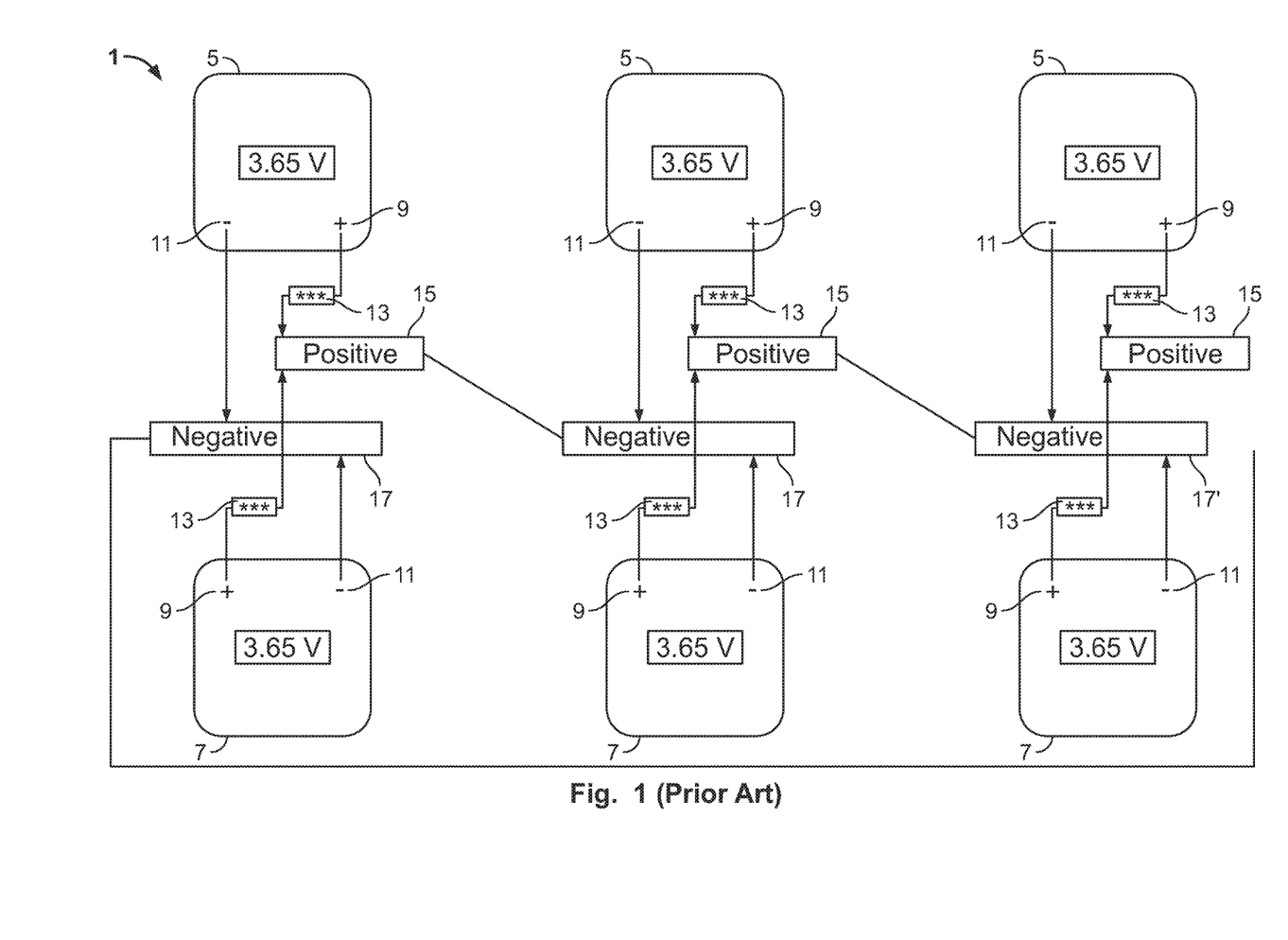
FIG. 1 is a schematic circuit diagram of a conventional battery pack protection arrangement.

A schematic circuit diagram of a conventional battery pack protection arrangement is shown in FIG. 1. Circuit 1 shows three first battery cells 5 and three second battery cells 7 positioned such that the positive electrode (also referred to as a terminal) 9 of each first cell 5 is aligned directly across from (or adjacent to when the first and second cells are "sandwiched" together) the negative electrode 11 of each second cell 7. Thermal cutoff devices 13 are electrically connected to each positive electrode 9 and electrical connection is made from the positive electrode of each first cell 5 to the positive electrode of each second cell 7 by means of a busbar 15 or other electrical connection. Negative electrodes 11 from the first cell 5 and second cell 7 are also connected by means of a busbar 17 or other electrical means, and a connection is made from the negative electrodes of one pair of first and second battery cells to the positive electrodes of a second part of first and second battery cells. Such connections often are made using wire. In order to connect to the relevant battery cell, relatively long lengths of wire may be needed, providing an interconnection that can be complicated and disordered. This can result in long manufacturing assembly times. In the event that the interconnecting wires cross one another, there is the possibility of electrical contact between wires, which is undesirable and can cause electrical shorting. As a result, electrical insulation may be used to prevent contact, increasing the cost of the arrangement and its complexity.

Figure 2:
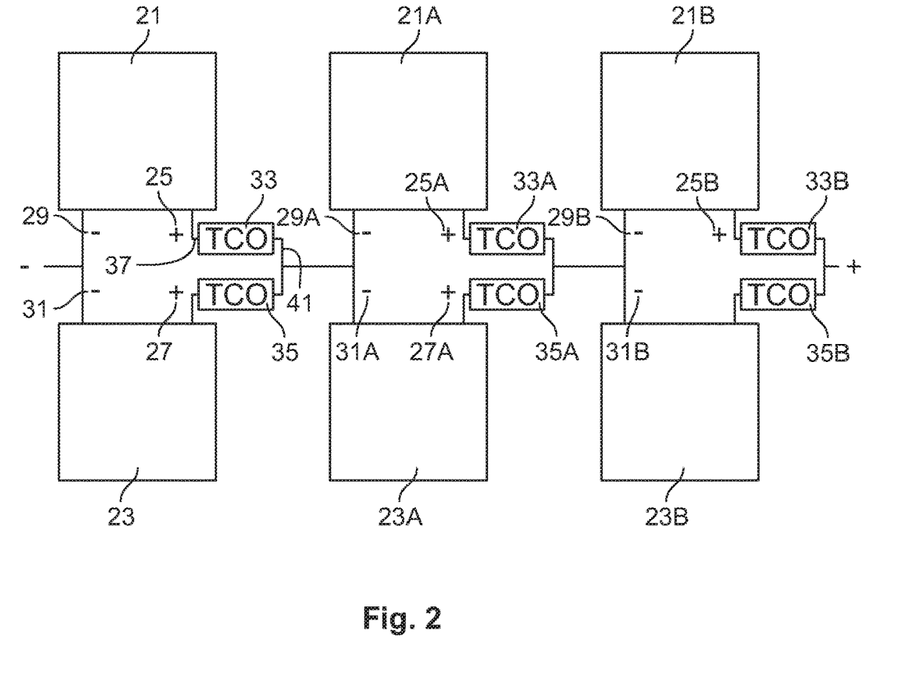
FIG. 2 is a schematic circuit diagram of a battery pack protection arrangement of the disclosure.

FIG. 2 is a schematic circuit diagram of a battery pack protection arrangement 20 of the disclosure. In this embodiment, three first battery cells 21, 21A, 21B each have a positive electrode 25 and a negative electrode 29. Three second battery cells 23, 23A, 23B each have a positive electrode 27 and a negative electrode 31. Each combination of a first battery cell 21 and a second battery cell 23 forms a pair 32, also known as a battery pack. A first protection device 33, which is shown in this embodiment as a thermal cutoff device (TCO), is electrically connected to the positive electrode 25 of the first battery cell by connection 37, while second protection device 35 is electrically connected to the positive electrode 27 of the second battery cell by connection 39. First and second protection devices are electrically connected via connection 41.

Figure 3:
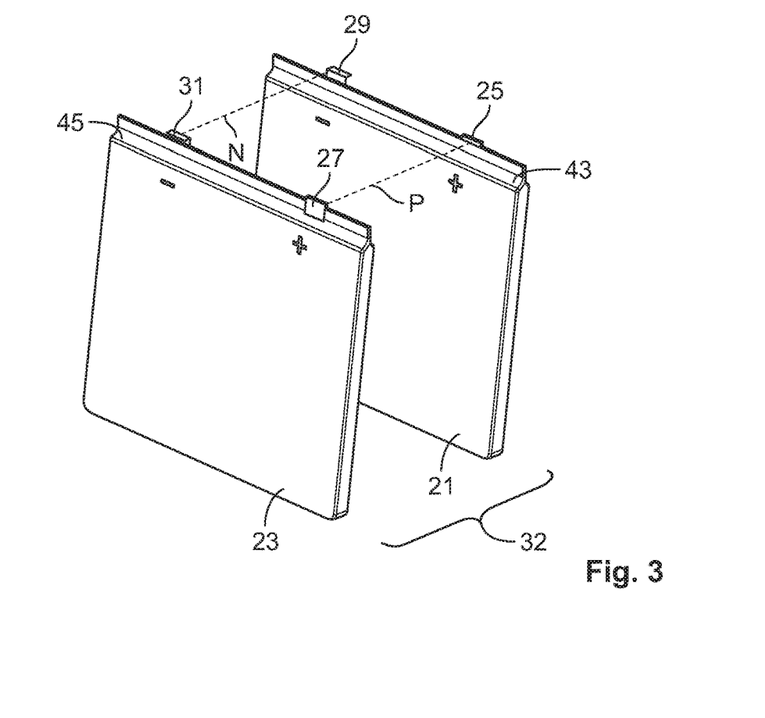
FIG. 3 is an exploded perspective view of a pair of battery cells of the disclosure.

As shown in more detail in the exploded schematic view in FIG. 3, the positive electrode 25 and negative electrode 29 are positioned on edge 43 of the first battery cell 21, and positive electrode 27 and negative electrode 31 are positioned on edge 45 of the second battery cell 23. It is important the first and second battery cells are positioned such that there is an alignment of polarity: the positive electrodes of each are aligned, i.e. positioned across from one another as shown in the schematic of FIG. 2. Line P of FIG. 3 shows this alignment of the positive terminals 25,27 and line N shows the alignment of negative terminals 29,31. Such alignment is key to allowing the simplified interconnection scheme of this disclosure.

Figure 4:
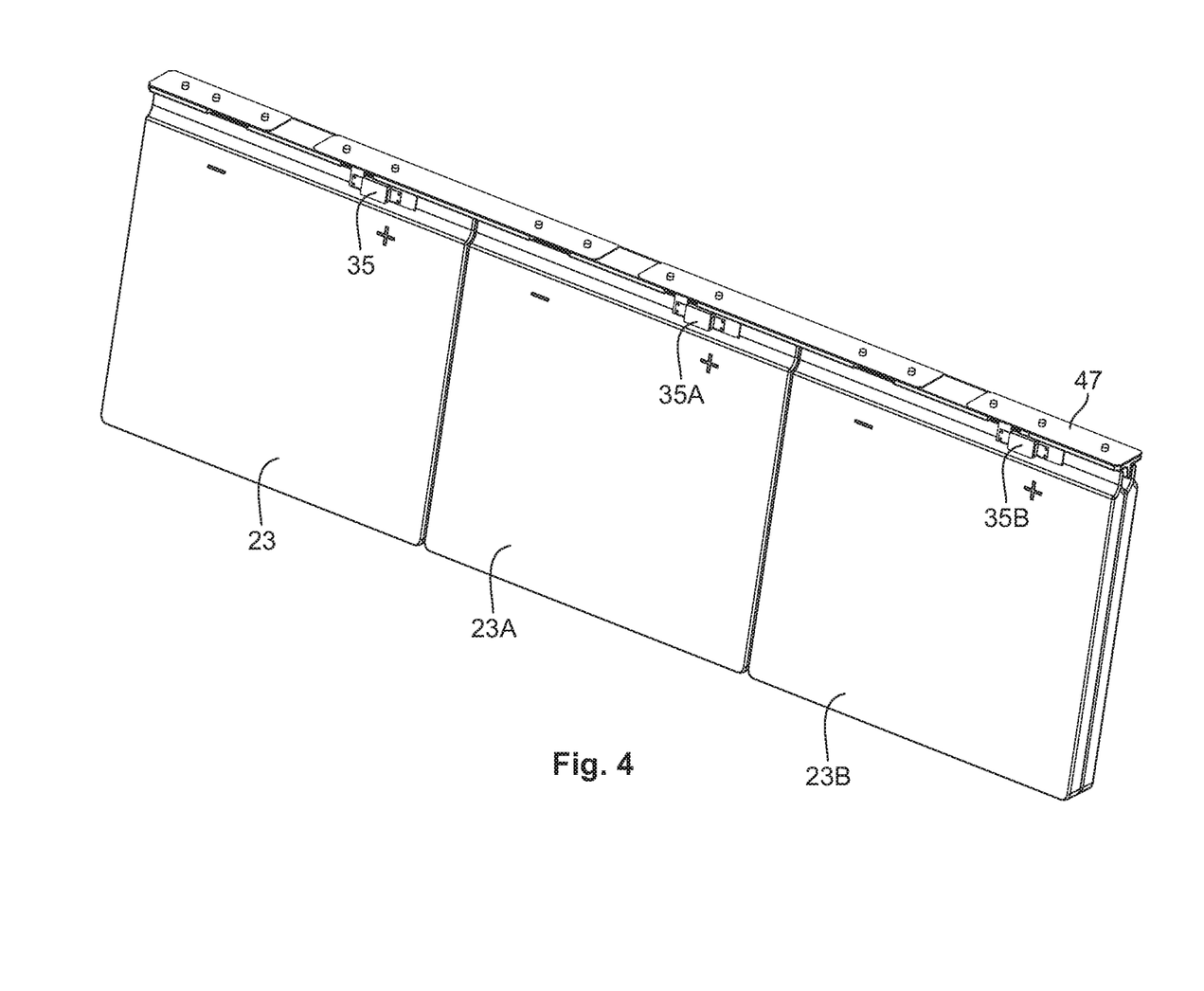
FIG. 4 is a perspective view of a battery pack protection arrangement of the disclosure.
Figure 5:
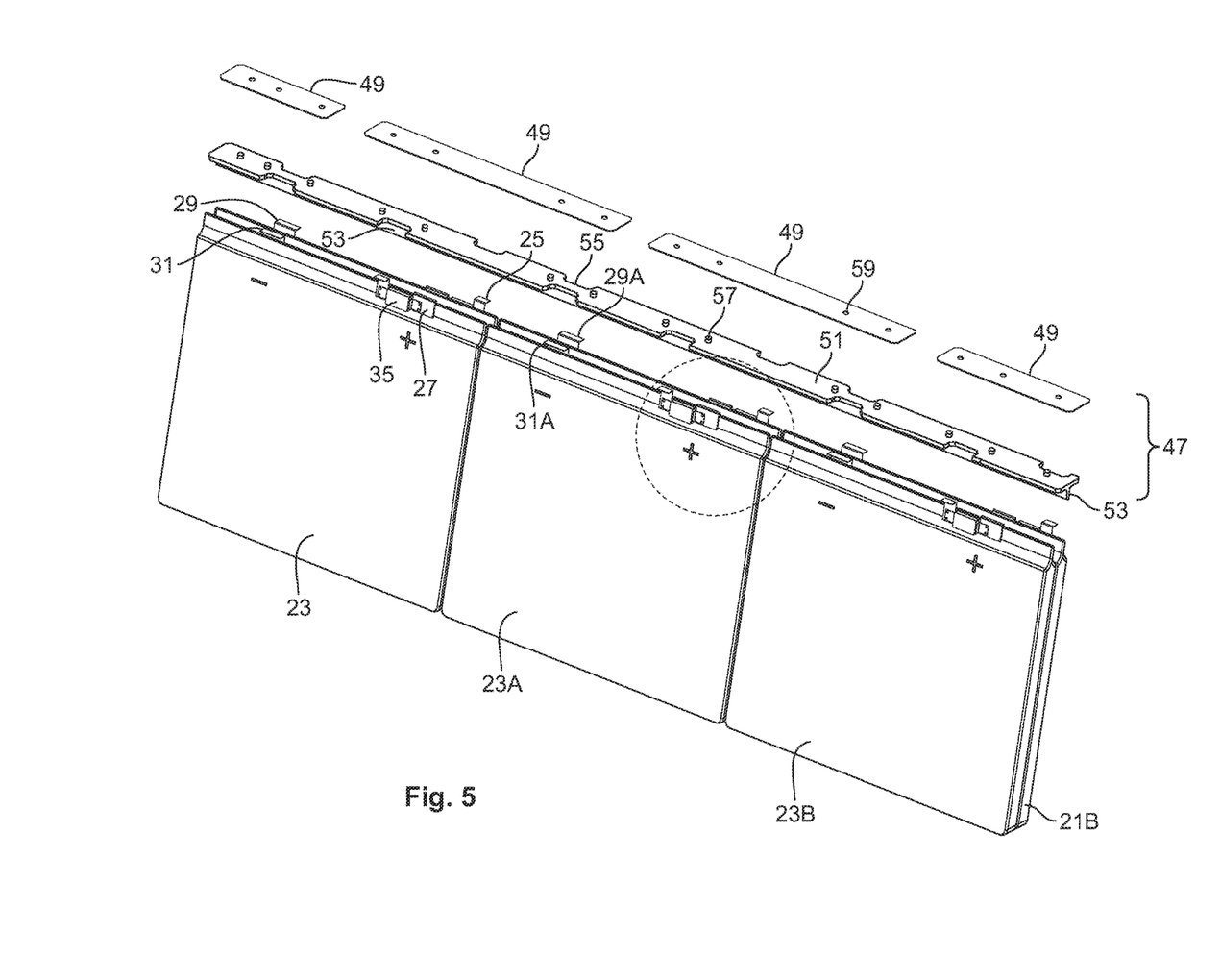
FIG. 5 is an exploded perspective view of the battery pack protection arrangement of FIG. 4.

FIGS. 4 and 5 show, in perspective view and exploded perspective view, respectively, a battery pack protection arrangement having three battery packs 23, 23A, 23B connected via a busbar 47. Metal layer 49 and an insulating carrier strip 51 combine to form busbar 47 which, when in one piece, can be used as a subassembly. In one embodiment, metal layer 49 is copper, although it can be any suitable metal. In the embodiment shown in FIG. 5, four metal strips form metal layer 49. For some applications, it is desirable to provide an insulating layer over the metal strip, leaving exposed metal areas for use in making an electrical connection, e.g. by welding. Insulating carrier strip 51 is made from any suitable electrically insulating (dielectric) material, and can act as a stiffener for the metal layer 49 in addition to providing electrical insulation. For ease of manufacture, carrier strip 51 is preferably plastic. Stiffener element 53 is part of carrier strip 51, as are notches 55, which allow access to appropriate positions for welding, and posts 57, which can protrude through aligned holes 59 on metal layer 49, acting to hold the elements in place during installation.

While three battery packs are shown in this embodiment, there may be any number of packs as necessary to provide power to the electronic equipment.

Figure 6:
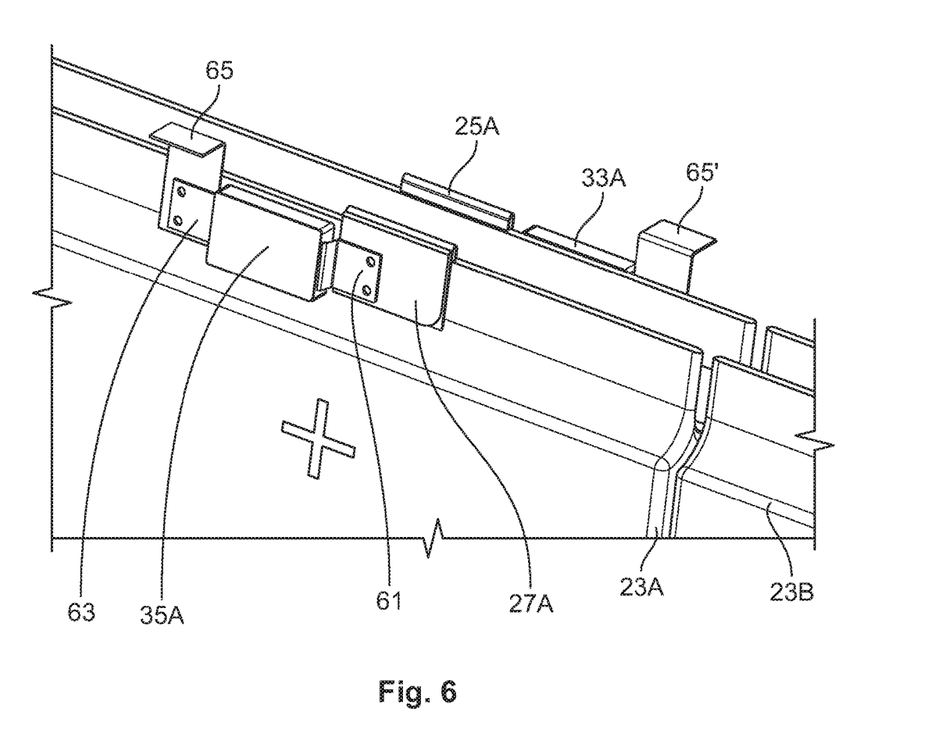
FIG. 6 is a detailed view of a section of FIG. 5.

FIG. 6 shows a detailed view of a section of FIG. 5. Protection device 35A is electrically attached, e.g. by welding or solder or other appropriate means, via first metal terminal 61 to positive terminal 27A and by second metal terminal 63 to attachment element 65, which serves to attach to busbar 47. Similar connections are made on the opposite side of the battery pack with protection device 33A connected to positive electrode 25A and to attachment post 65'.

Figure 7:
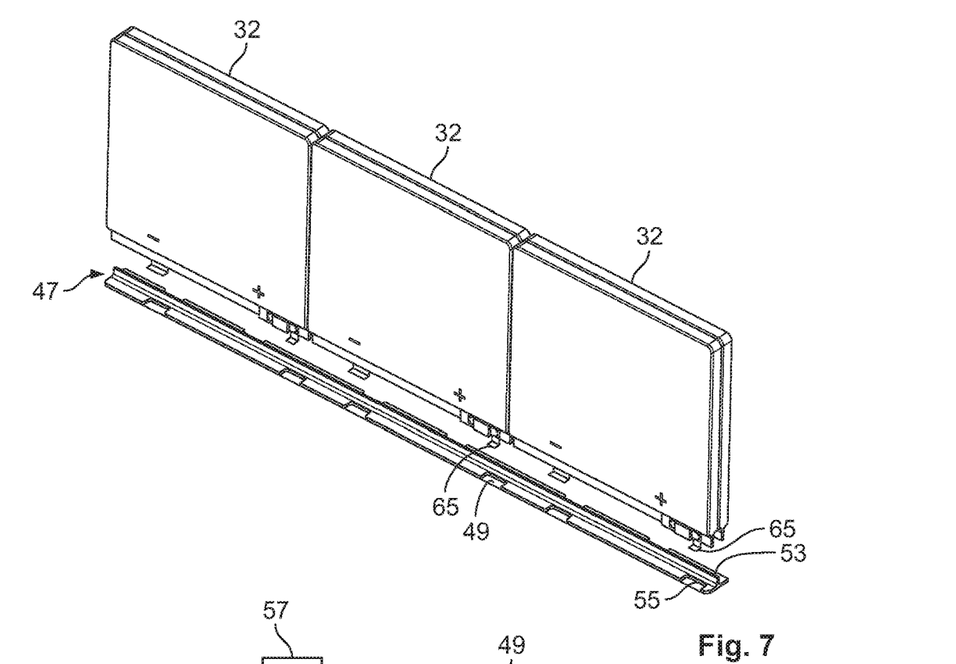
FIG. 7 is an exploded perspective view from the bottom of the battery pack protection arrangement of the disclosure.

FIG. 7 shows an exploded view from the bottom of busbar 47 and three battery packs 32. Visible is the access that is provided via notches 55 to allow electrical connection to attachment posts 65.

Figure 8:
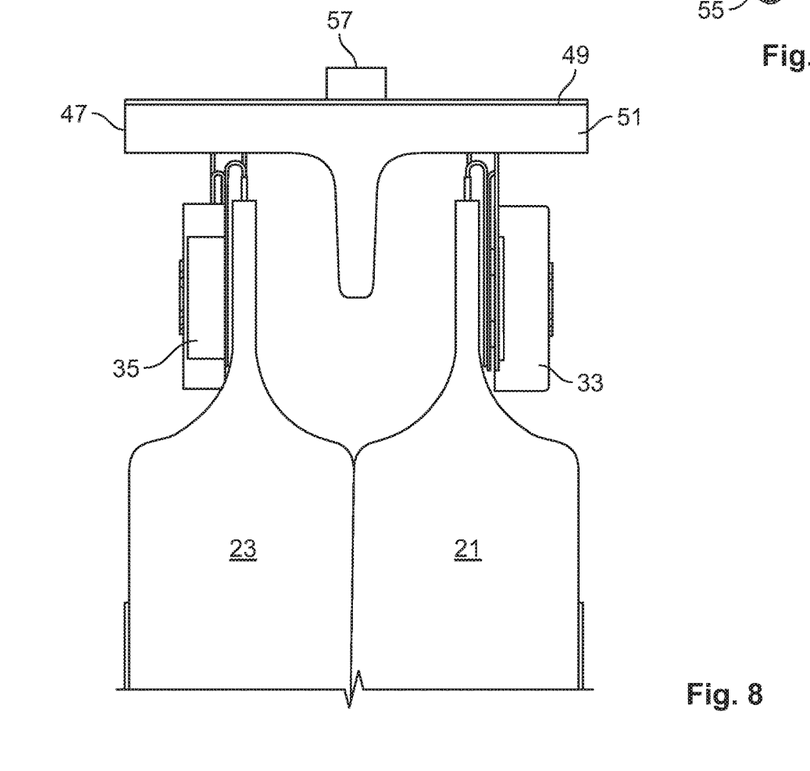
FIG. 8 is a cross-sectional view of the battery pack protection arrangement of the disclosure.

FIG. 8 shows in cross-section the assembled protection arrangement 20.

The method of protecting a battery pack disclosed includes providing first and second battery cells, each with positive and negative electrodes. Also provided are first and second protection devices. The positive electrodes of the first and second battery cells are aligned to form a pair and an electrically conductive busbar is positioned such that there is an electrical connection of the positive electrode of the first battery cell to the first protection device, the positive electrode of the second battery cell to the second protection device, the first protection device to the second protection device, and the negative electrode of the first battery cell to the negative electrode of the second battery cell. The electrical connection can be made by welding, soldering, the use of a conductive adhesive, mechanical attachment (e.g. via staples or rivets), or any other suitable means.

The protection device may be a thermal cutoff device, for example a device comprising a bimetal element. Alternatively, it may be a positive temperature coefficient of resistance (PTC) device. It is particularly preferred that the protection device be resettable. Suitable devices are MHP-TA devices sold by Tyco Electronics Corporation, which have both a polymeric PTC component and a bimetal element.

Disclosed is an interconnection battery protection layout that can protect multiple battery cells electrically in a parallel and series arrangement by a simple interconnect bar. The battery interconnect protection layout has multiple pair of battery cell layout arranged with the positive electrode in one cell aligned with the positive electrode in another battery cell to realize the simplicity of the design. Referring back to FIGS. 2 and 5, in one embodiment, for use with a six battery pack, the battery protection interconnect, i.e. busbar, could consist of four insulated conductive metal strips with exposed connecting areas attached to one insulator strip. The first metal strip is connected to both of the negative electrodes in batteries 21 and 23. The second metal strip is connected to two circuit protection devices from the positive side of batteries 21 and 23 to the negative side of batteries 21A and 23A. The third metal strip is the same as the second metal strip. Finally, the fourth metal strip is connected to two circuit protection devices and to a positive electrode. The interconnect battery protection layout will allow a simple design for multiple battery cells and circuit protection devices with a parallel/series connection.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extend appropriate, in the context of another figure, in combination with another feature, or in the invention in general.

It will be understood that the above-described arrangements of apparatus and the methods therefrom are merely illustrative of applications of the principles or this invention and many other embodiments and modifications may be made without departing from the spirit and scope of the invention as defined in the claims.

What is claimed is:

1. A method of protecting a battery pack comprising:
    (a) providing first and second battery cells in a flatly abutting arrangement with each other, with a major surface of the first battery cell confronting and in direct contact with a major surface of the second battery cell, each of the first and second battery cells having (i) a positive electrode, (ii) a negative electrode, and (iii) an edge spaced apart from the confronting major surfaces;
    (b) providing a first protection device electrically connected to the positive electrode of the first battery cell and providing a second protection device electrically connected to the positive electrode of the second battery cell;
    (c) disposing the edge of the first battery cell in a parallel relationship with the edge of the second battery cell, with the positive electrodes of the first and second battery cells positioned directly across from one another in a direction perpendicular to the edges of the first and second battery cells;
    (d) disposing an electrically conductive busbar on the edges of the first and second battery cells, the busbar extending in a first direction perpendicular to the major surfaces of the first and second battery cells from a point intermediate the edges of the first and second battery cells to a point beyond the edge of the first battery cell and extending in a second direction perpendicular to the major surfaces of the first and second battery cells from a point intermediate the edges of the first and second battery cells to a point beyond the edge of the second battery cell; and
    (e) electrically connecting the first protection device to the second protection device and electrically connecting the negative electrode of the first battery cell to the negative electrode of the second battery cell by means of the busbar.

2. The method of claim 1 wherein the first and second battery cells are lithium batteries or lithium polymer batteries.

3. The method of claim 1 wherein at least one of the first and second protection devices is a thermal cutoff device.

4. The method of claim 3 wherein the thermal cutoff device comprises a bimetal component.

5. The method of claim 1 wherein the first and second protection devices are thermal cutoff devices.

6. The method of claim 1 wherein at least one of the first and second protection devices is a positive temperature coefficient (PTC) device.

7. The method of claim 1 wherein the first and second protection devices are PTC devices.

8. The method of claim 1 wherein the busbar comprises copper.

9. The method of claim 8 wherein the busbar further comprises an insulating carrier strip attached to the busbar.

10. The method of claim 9 wherein the insulating carrier strip comprises plastic.

11. The method of claim 1 which comprises providing multiple pairs of first and second battery cells.

12. A battery pack protection assembly comprising:
    (a) first and second battery cells disposed in a flatly abutting arrangement with each other, with a major surface of the first battery cell confronting and in direct contact with a major surface of the second battery cell, each of the first and second battery cells having (i) a positive electrode, (ii) a negative electrode, and (iii) an edge spaced apart from the confronting major surfaces, the edge of the first battery cell disposed in a parallel relationship with the edge of the second battery cell, with the positive electrodes of the first and second battery cells positioned directly across from one another in a direction perpendicular to the edges of the first and second battery cells;
    (b) a first protection device electrically connected to the positive electrode of the first battery cell and a second protection device electrically connected to the positive electrode of the second battery cell; and
    (c) an electrically conductive busbar positioned on the edges of the first and second battery cells and electrically connecting the first protection device to the second protection device and the negative electrode of the first battery cell to the negative electrode of the second battery cell, the busbar extending in a first direction perpendicular to the major surfaces of the first and second battery cells from a point intermediate the edges of the first and second battery cells to a point beyond the edge of the first battery cell and extending in a second direction perpendicular to the major surfaces of the first and second battery cells from a point intermediate the edges of the first and second battery cells to a point beyond the edge of the second battery cell.

13. The protection assembly of claim 12 which comprises multiple pairs of first and second battery cells connected by the busbar.

14. The protection assembly of claim 12 wherein at least one of the first and second protection devices is a thermal cutoff device.

15. The protection assembly of claim 14 wherein both the first and second protection devices are thermal cutoff devices.

16. The protection assembly of claim 12 wherein at least one of the first and second protection devices is a positive temperature coefficient (PTC) device.

17. The protection assembly of claim 16 wherein the first and second protection devices are PTC devices.

18. The protection assembly of claim 12 wherein the busbar comprises copper.

19. The protection assembly of claim 18 wherein the busbar further comprises an insulating carrier strip attached to the busbar.

20. The protection assembly of claim 12 which comprises multiple pairs of first and second battery cells.

* * * * *